(12) United States Patent
Ladouceur et al.

(10) Patent No.: US 8,970,477 B2
(45) Date of Patent: Mar. 3, 2015

(54) HANDHELD DEVICE HAVING RETRACTABLE KEYPAD ASSEMBLY

(75) Inventors: Norman Miner Ladouceur, Wingham (CA); Jason Tyler Griffin, Kitchener (CA); Martin Riddiford, Dulwich (GB); Daniel Jordan Kayser, London (GB); Tracy Christina Sharp, London (GB); Rachael Elizabeth Roberts, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 331 days.

(21) Appl. No.: 13/399,032

(22) Filed: Feb. 17, 2012

(65) Prior Publication Data

US 2013/0033432 A1 Feb. 7, 2013

Related U.S. Application Data

(63) Continuation-in-part of application No. 13/197,392, filed on Aug. 3, 2011, now Pat. No. 8,743,050.

(51) Int. Cl.
*G06F 3/02* (2006.01)
*G06F 1/16* (2006.01)
(Continued)

(52) U.S. Cl.
CPC ......... *G06F 1/1666* (2013.01); *H01H 13/7065* (2013.01); *G06F 1/1624* (2013.01);
(Continued)

(58) Field of Classification Search
USPC .................. 345/156–184; 341/20, 22–34
See application file for complete search history.

(56) References Cited

U.S. PATENT DOCUMENTS

| 5,044,798 A | 9/1991 | Roylance et al. |
| 5,141,343 A | 8/1992 | Roylance et al. |

(Continued)

FOREIGN PATENT DOCUMENTS

| DE | 4337553 A1 | 5/1995 |
| WO | 2011001271 A1 | 1/2011 |

OTHER PUBLICATIONS

Extended European Search Report; Application No. 11176488.2-2224; Date Mailed: Oct. 7, 2011; pp. 1-4.
(Continued)

*Primary Examiner* — Alexander S Beck
*Assistant Examiner* — Jeffrey Steinberg
(74) *Attorney, Agent, or Firm* — Conley Rose, P.C.; J. Robert Brown, Jr.

(57) ABSTRACT

A exemplary key assembly for a handheld device includes one or more L-shaped key structures each having a first member configured to receive an input keystroke and a second member substantially orthogonal to the first member; and a frame configured to receive the one or more L-shaped key structures, the frame having a wall aligned with the second member of the key structure, with the wall further comprising a switch for each of the one or more L-shaped key structures associated with an inner surface of the wall, wherein each switch is associated with an actuator associated with the second member of the corresponding key structure such that depression of a given key structure causes the actuator of the second member of the key structure to engage the switch of the wall.

20 Claims, 10 Drawing Sheets

(51) Int. Cl.
*H01H 13/7065* (2006.01)
*H01H 3/12* (2006.01)

(52) U.S. Cl.
CPC ......... *H01H 3/125* (2013.01); *H01H 2223/052* (2013.01); *H01H 2231/022* (2013.01); *H01H 2221/016* (2013.01); *H01H 2225/028* (2013.01)
USPC ........... 345/156; 345/157; 345/158; 345/159; 345/160; 345/161; 345/162; 345/163; 345/164; 345/165; 345/166; 345/167; 345/168; 345/169; 345/170; 345/171; 345/172; 345/173; 345/174; 345/175; 345/176; 345/177; 345/178; 345/179; 345/180; 345/181; 345/182; 345/183; 345/184

(56) References Cited

U.S. PATENT DOCUMENTS

| | | | |
|---|---|---|---|
| 6,028,279 | A | 2/2000 | Suryan et al. |
| 6,139,207 | A | 10/2000 | Kawabe |
| 6,331,850 | B1 | 12/2001 | Olodort et al. |
| 7,283,852 | B2 | 10/2007 | Fagerstrom et al. |
| 7,372,959 | B2 | 5/2008 | Ladouceur et al. |
| 8,139,207 | B2 | 3/2012 | Braig et al. |
| 2008/0252605 | A1* | 10/2008 | Muyskens et al. ............ 345/172 |
| 2009/0168317 | A1 | 7/2009 | Wang et al. |
| 2009/0180246 | A1 | 7/2009 | Babella |
| 2009/0251854 | A1 | 10/2009 | Leung |
| 2009/0279239 | A1 | 11/2009 | Ha et al. |
| 2010/0014236 | A1 | 1/2010 | Zou et al. |
| 2010/0142138 | A1 | 6/2010 | Wang |

OTHER PUBLICATIONS

Communication: Extended European Search Report; Application No. 12156071.8-2224; Date Mailed: Apr. 27, 2012; pp. 1-4.
U.S. Appl. No. 13/197,392; Non-Final Office Action; Date Filed: Aug. 3, 2011; Date Mailed: Aug. 8, 2013; pp. 1-19.
European Examination Report; Application No. 12156071.8; Dec. 2, 2014; 4 pages.

\* cited by examiner

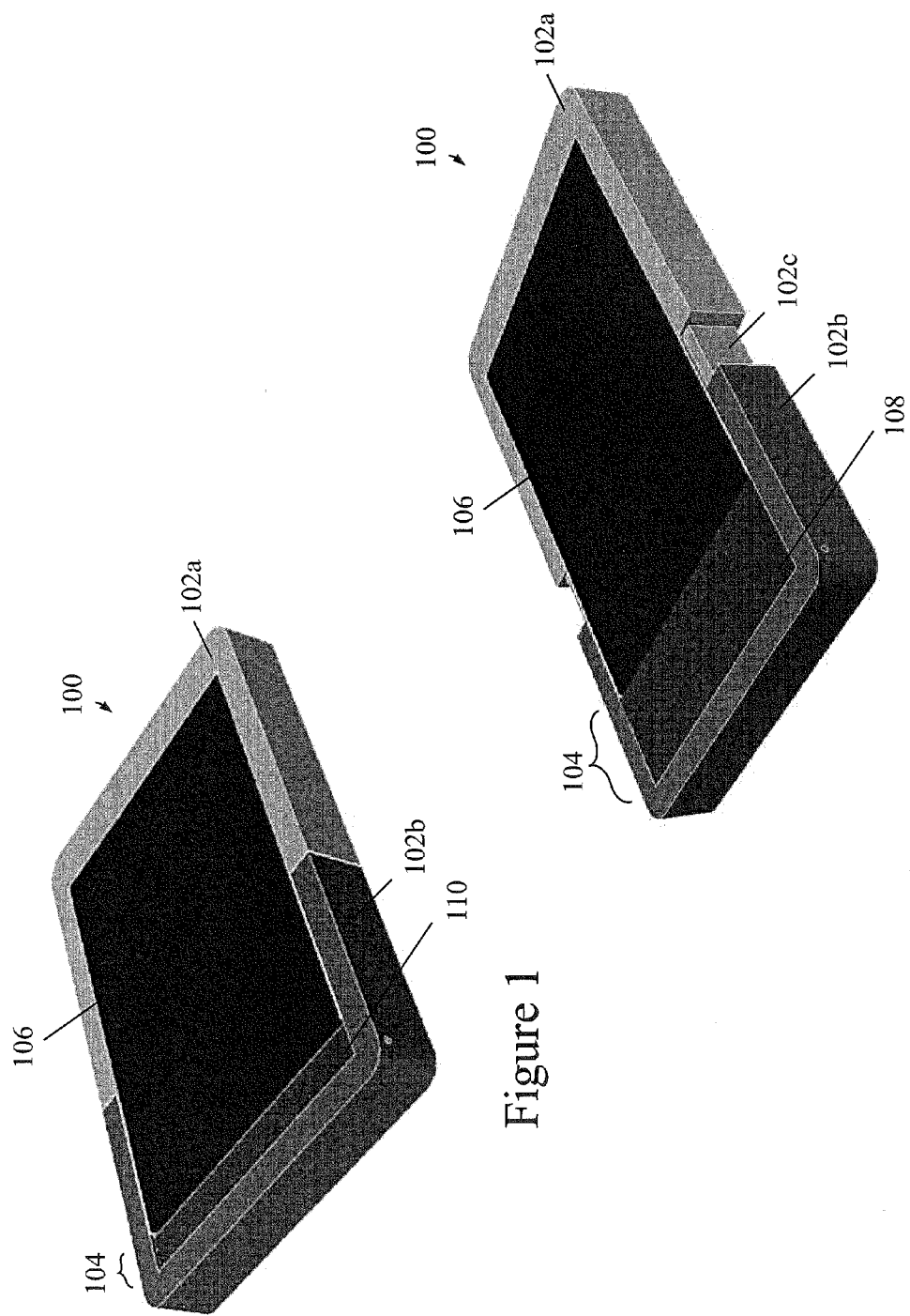

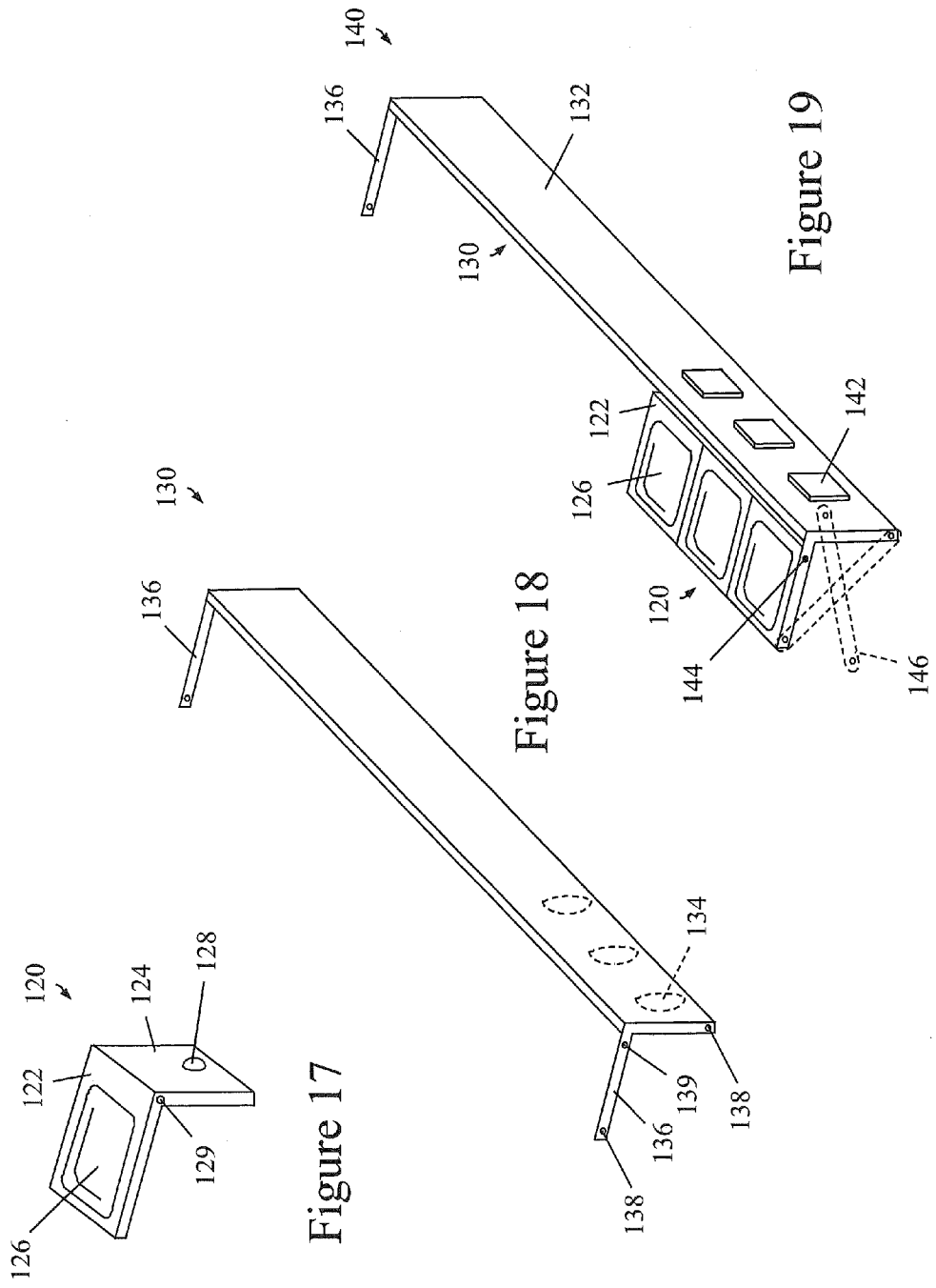

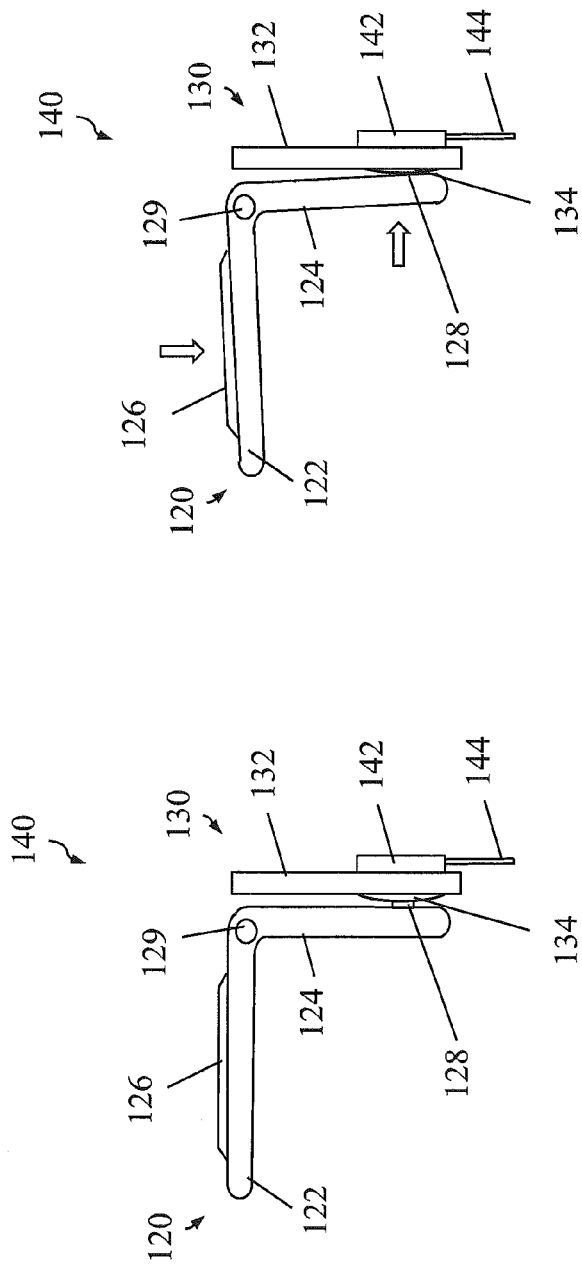

HANDHELD DEVICE HAVING RETRACTABLE KEYPAD ASSEMBLY

CROSS-REFERENCE TO RELATED APPLICATIONS

This non-provisional U.S. Patent Application is a continuation-in-part of pending U.S. patent application Ser. No. 13/197,392, which was filed Aug. 3, 2011, and is assigned to the present assignee.

BACKGROUND

The present invention relates generally to handheld device technologies and, more particularly, to a handheld device having a retractable keypad assembly.

Keyboards and keypads are used on a wide variety of handheld devices such as, for example, telephones, mobile communication devices, remote control devices, and the like. The size of keyboards has continued to shrink over time as newer and smaller handheld devices become popular. As the size of such handheld devices has decreased, the more important it has become to utilize the entire keyboard surface as efficiently as possible.

In addition to traditional numerical keypads used for dialing a telephone number, next generation smart phones and mobile computing devices for example may also include additional interfaces such as touch screen or physical button QWERTY keypads to facilitate text messaging, e-mailing, web browsing and other functions. One such configuration may be the so-called slider phone that includes a sliding cover that may be opened to expose the additional keyboard for increased text input functionality. In devices like this (or with other folding or clamshell style devices), a significant amount of internal device real estate is reserved to accommodate the keypad and associated mechanism. This in turn results in a larger or thicker housing that is not as desirable as a thinner, albeit less functional, alternative.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a perspective view of one exemplary embodiment of a handheld electronic device, shown in a retracted keypad orientation;

FIG. 2 is a perspective view of the handheld electronic device of FIG. 1, shown in an extended keypad orientation;

FIG. 17 is a perspective view of an exemplary key structure of a first portion of a key assembly;

FIG. 18 is a perspective view of an exemplary rotating frame serving as a second portion of a key assembly;

FIG. 19 is a perspective view of the exemplary key assembly illustrating the relationship between the key structures and the rotating frame;

FIG. 20 is a side cross sectional view of the key assembly including the key structure and rotating frame; and FIG. 21 is a side cross sectional view of the key assembly including the key structure and rotating frame, where the key structure shown in a depressed position so as to engage a dome switch of the rotating frame.

DETAILED DESCRIPTION

Figure 3:
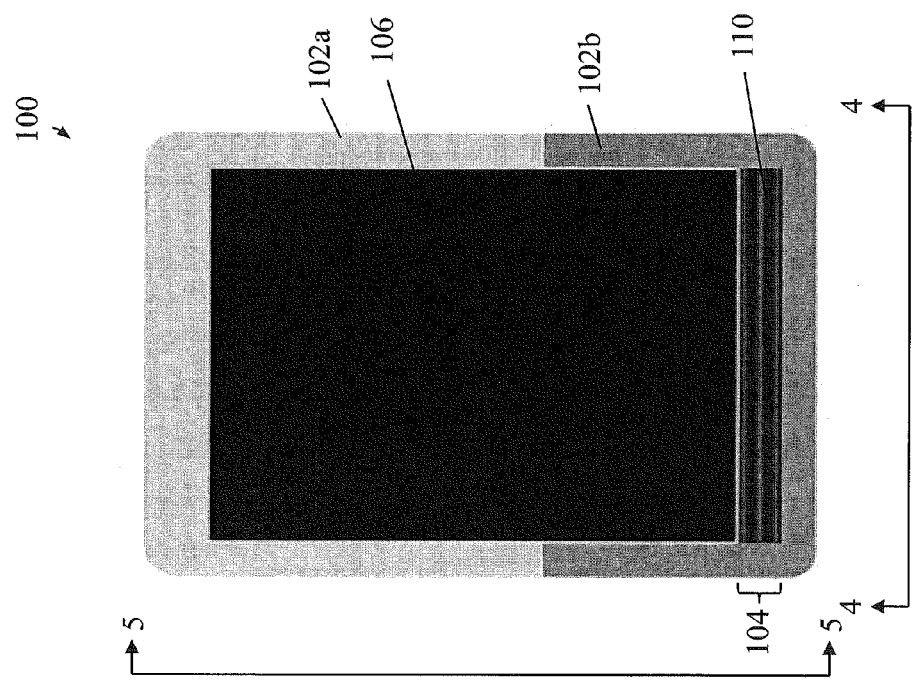
FIG. 3 is a top view of the handheld electronic device of FIG. 1, shown in the retracted keypad orientation.

Disclosed herein are embodiments of a retractable keypad assembly for handheld devices such as telephones, mobile communication devices, remote control devices, and the like. Such embodiments allow for multiple rows (or columns) of keys to be movably positioned between a first orientation in which a top surface of an individual key is exposed to a user, and a second orientation in which the top surface of the key rotationally (and in some cases translationally) retracts into the housing so as to expose an edge surface of the key. When retracted, the keys may define a styling feature and/or a touch navigation feature. When in the opened position, the multiple rows of keys (e.g., 3, 4, 5 rows) may serve as a fully functional keyboard and can further include touch navigation functionality as well.

In addition, each row (or column of keys) is implemented by embodiments of a keypad assembly characterized by one or more L-shaped key structures each having a first member configured to receive an input keystroke and a second member substantially orthogonal to the first member. A frame receives the L-shaped key structures, such that a wall of the frame is aligned with the second member of the key structure. In one embodiment, an inner surface of the wall includes a switch for each of the one or more L-shaped key structures, where each switch is proximate to an actuator associated with the second member of the corresponding key structure. By depressing a given key structure, the actuator of the second member of the key structure engages the switch on the wall.

The embodiments described herein may facilitate, for example, exposing or hiding a physical keyboard within the footprint of a "standard size" smartphone. In some embodiments, the keyboard may be augmented by touchscreen prompts and thus resides close to the edge of a touchscreen when in use. It is contemplated that the keyboard embodiments herein may either configured for landscape or portrait use, thus helping the housing volume to be kept to a minimum.

Referring initially to FIGS. 1 and 2, there is shown a handheld electronic device 100 in accordance with an exemplary embodiment. The device 100 includes a segmented housing including a first portion 102a and a second portion 102b, a keypad assembly 104 configured within the segmented housing, and a display screen 106 configured within the segmented housing. The keypad assembly 104 includes one or more groups of keys configured for movable positioning between a first or extended orientation (shown in FIG. 2) in which a first or top surface 108 of an individual key is exposed to a user, and a second or retracted orientation (shown in FIG. 1) in which the first surface 108 of the key rotationally (and in some cases translationally) retracts into the housing so as to expose a second or edge surface 110 of the key, the second surface 110 disposed adjacent to the first surface 108. In other words, depending upon the row position of a given key, the first surface 108 of the key undergoes rotational movement, and possibly both rotational and translational movement. Transitioning of the keypad assembly 104 from the retracted to the extended positions and vice versa may be achieved, for example, by sliding the second portion 102b of the housing away from the first portion 102a, and back toward one another.

It will be noted that the specific configuration of the keypad assembly 104 shown in FIGS. 1 and 2 is exemplary only and thus should not be construed in any limiting sense. Rather, it is contemplated that other keypad configurations in accordance with the disclosed concepts may include different numbers of rows and columns of keys.

In the exemplary embodiments shown in FIGS. 1 and 2, the display screen 106 (or more generally an output apparatus) has a substantially planar surface and may include any structure suitable for providing a visual output to a user such as, for example, an LCD screen. In other embodiments, a handheld electronic device need not be provided with such a display screen.

With specific reference now to FIG. 2, in the first orientation of the keypad assembly 104 (as indicated above) the handheld device 100 may be suited for a "full" input experience for the user, in that a fully functional keypad is exposed to facilitate, for example, full text input. Optionally, the first orientation shown in FIG. 2 may also be configured for so-called "touch navigation" that provides additional functionality beyond traditional touch-typing of the individual keys. For example, the keypad assembly 104 in the first orientation may be configured with capacitive touch sensor technology that allows for (for example) navigation between features depicted on the display screen 106. As also depicted in FIG. 2, the segmented housing is fully extended so as to reveal a third portion 102c. The third portion 102c may, for example, be fully integrated with the first portion 102a and serve as a rail over which the second portion 102b slides.

In contrast, as depicted in FIG. 1, in the second orientation of the keypad assembly 104, the rows of keys have been rotationally (or rotationally and translationally) retracted within the interior of the housing such that the first surface 108 of the keys is no longer exposed, and instead a second surface 110 of the keys is now exposed to the user. Notably, movement of the handheld device 100 from the first orientation in FIG. 2 to the second orientation of FIG. 1 involves reducing the overall length of the segmented housing along a longitudinal axis thereof such that the retractable third portion 102c disappears and the first and second portions 102a, 102b, abut one another. Conversely, movement of the handheld device 100 from the second orientation in FIG. 1 to the first orientation in FIG. 2 involves expanding the length of the segmented housing along the longitudinal axis, thereby revealing the third portion 102c.

With specific reference to FIG. 1, the retracted keypad assembly 104 may be configured as a "styling" feature per se, in that touching or depression of the second surface 110 of the keys serves no function in particular. Alternatively, the retracted keypad assembly 104 may be configured for touch navigation functions, such as by swiping of a user's finger across one or more of the keys in a given direction. Here, the second surface 110 of the keys may also be provided with capacitive touch sensor capability.

Figure 4:
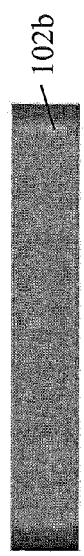
FIG. 4 is an end view of the handheld electronic device, taken along the lines 4-4 of FIG. 3.
Figure 5:
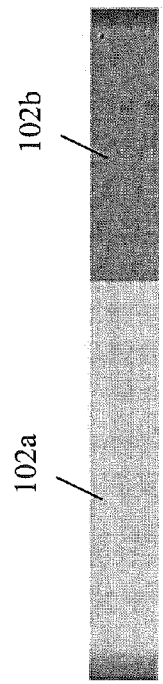
FIG. 5 is a side view of the handheld electronic device, taken along the lines 5-5 of FIG. 3.
Figure 7:
FIG. 7 is an end view of the handheld electronic device, taken along the lines 7-7 of FIG. 3.
Figure 8:
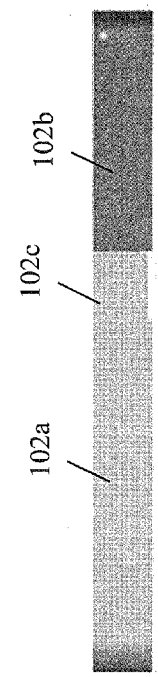
FIG. 8 is a side view of the handheld electronic device, taken along the lines 8-8 of FIG. 3.
Figure 6:
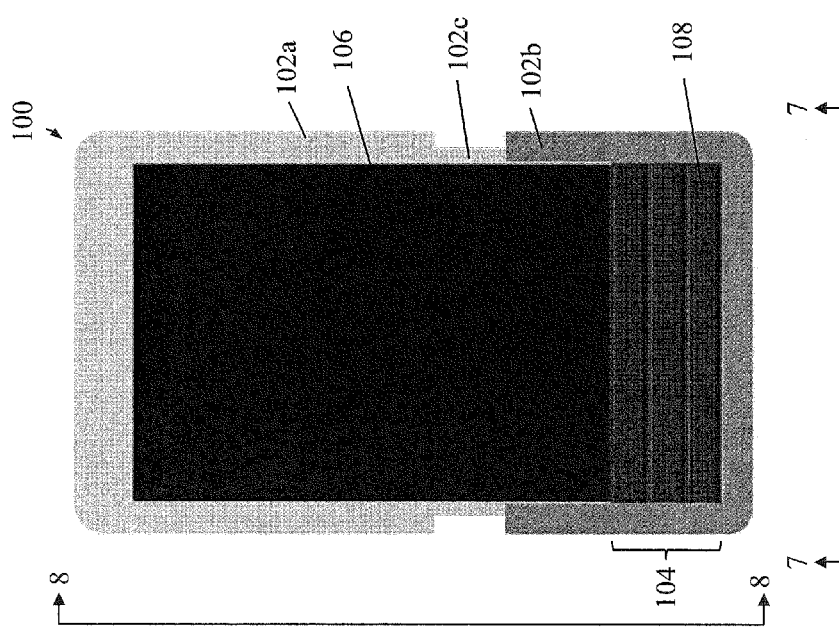
FIG. 6 is a top view of the handheld electronic device of FIG. 2, shown in the extended keypad orientation.

Additional views of the second orientation of the handheld device 100 may be found in FIGS. 3-5, in which FIG. 3 is a top view of the handheld device 100. FIG. 4 is an end view of the handheld electronic device 100, taken along the lines 4-4 of FIG. 3, while FIG. 5 is a side view of the handheld electronic device, taken along the lines 5-5 of FIG. 3. Similarly, additional views of the first orientation of the handheld device 100 may be found in FIGS. 6-8, in which FIG. 6 is a top view of the handheld device 100. FIG. 7 is an end view of the handheld electronic device 100, taken along the lines 7-7 of FIG. 6, while FIG. 8 is a side view of the handheld electronic device 100, taken along the lines 8-8 of FIG. 6.

Figure 9:
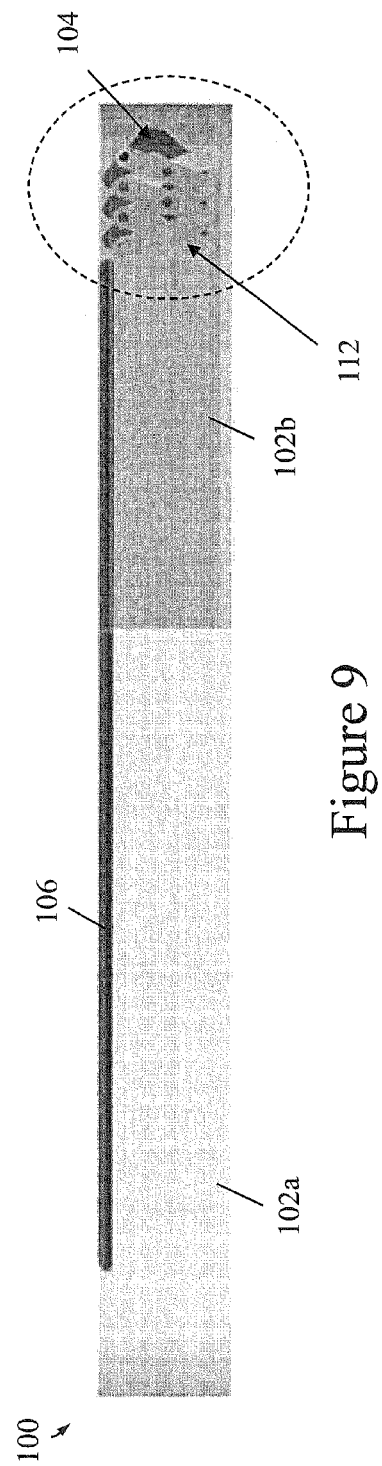
FIG. 9 is a side view of the handheld electronic device shown in the retracted keypad orientation, and illustrating an exemplary interior scissor linkage assembly that may be used to facilitate movement of a keypad assembly from the retracted position to the extended position.
Figure 10:
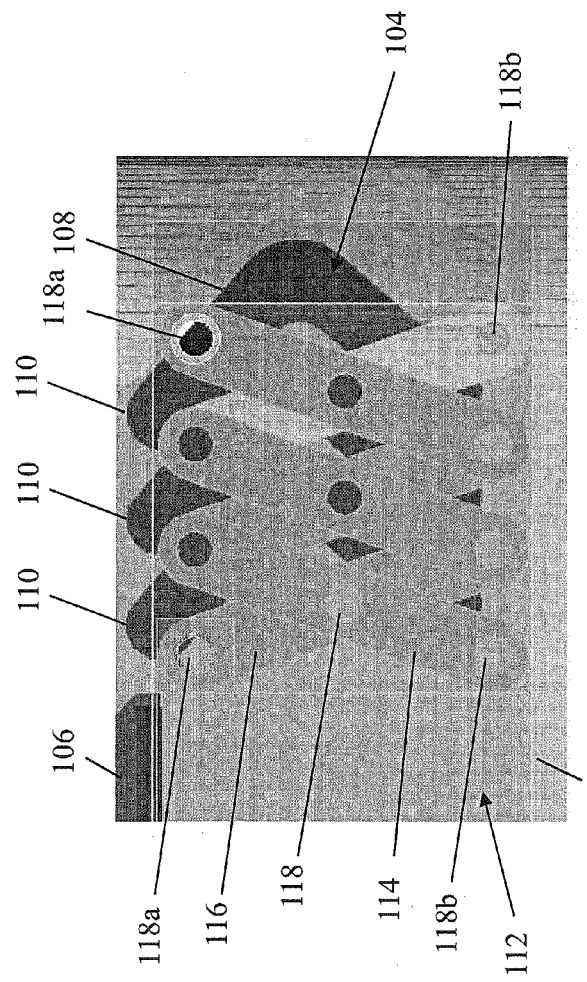
FIG. 10 is an enlarged view of the scissor linkage assembly of FIG. 9.

Referring now to FIGS. 9 and 10, there is shown a side view of the handheld electronic device 100 shown in the retracted keypad orientation (similar to the view of FIG. 5), and further illustrating an exemplary interior scissor linkage assembly 112 that may be used to facilitate movement of the keypad assembly 104 from the retracted position to the extended position. FIG. 10 is an enlarged view of the keypad assembly 104 and scissor linkage assembly 112 shown in the dashed portion of FIG. 9. Here, the keys of the keypad assembly 104 are depicted in the second or rotationally/translationally retracted position within the electronic device segmented housing such that the second or edge surfaces 110 of the keys are exposed. In contrast, the first or top surfaces 108 of the keys are retracted into the second housing portion 102b.

The scissor linkage assembly 112 includes a plurality of serially interconnected cross-shaped pairs of elongated lever arms 114, 116, with the two lever arms from each pair being pivotally interconnected at their intermediate length section by first pivot mounts 118. Outer ends of the elongated lever arms 114, 116, are connected to outer ends of an adjacent pair of elongated lever arms by second pivot mounts 118a, 118b. In the orientation depicted, the left most pair of second pivot mounts 118a, 118b remains fixed with respect to a horizontal direction, while the each of the top second pivot mounts 118a remains fixed with respect to a vertical direction. Thus, leftmost top first pivot mount 118a specifically shown in FIG. 10 remains fixed with respect to both horizontal and vertical directions, which in turn enables upward and rightward extension of the scissor linkage assembly 112 as shown in subsequent figures.

Figure 11:
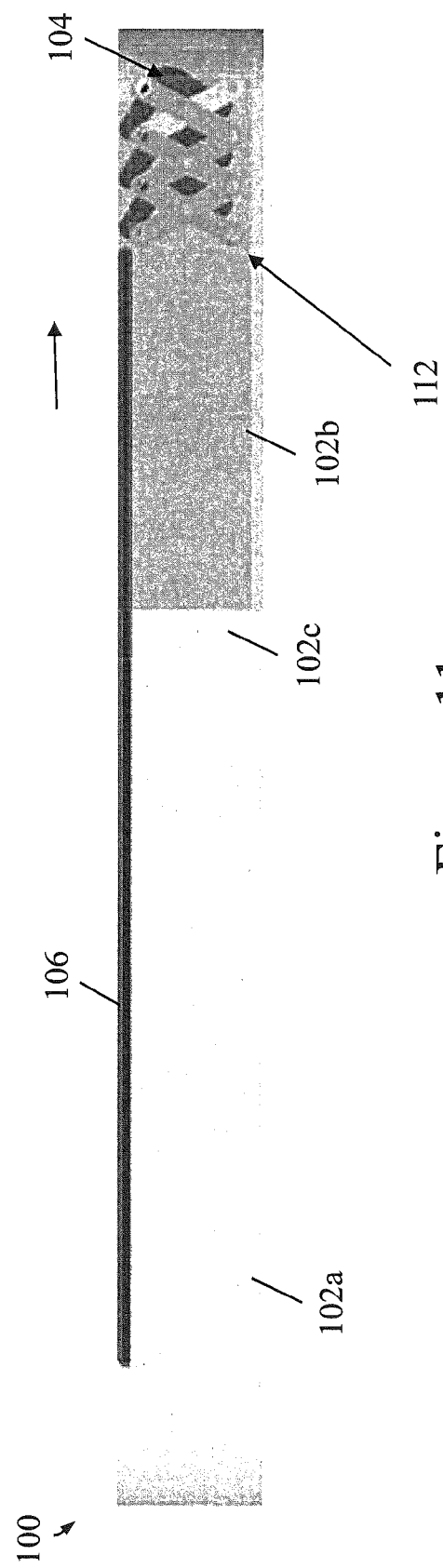
FIG. 11 is a side view of the handheld electronic device shown in FIG. 9, as it begins to move from the retracted keypad orientation to the extended keypad orientation.
Figure 12:
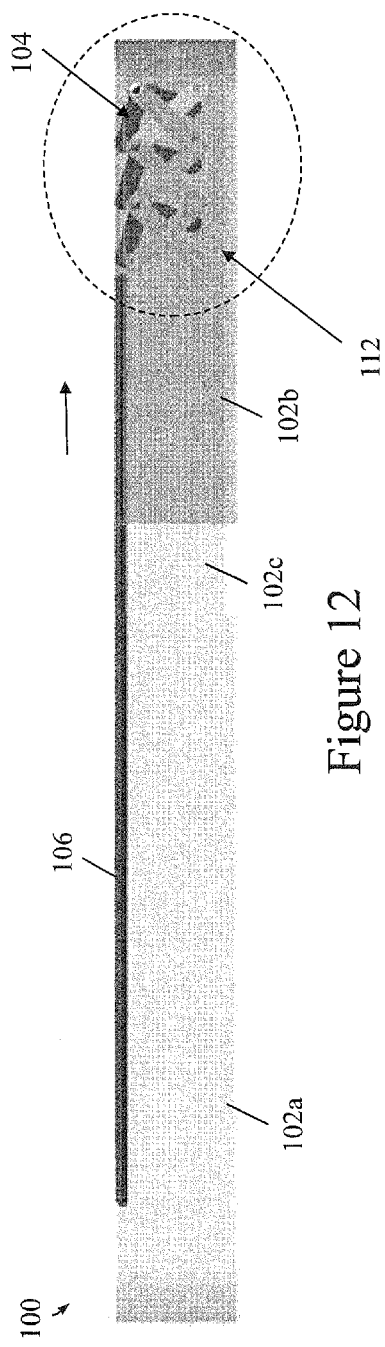
FIG. 12 is a side view of the handheld electronic device shown in FIG. 11, as it continues to move from the retracted keypad orientation to the extended keypad orientation.
Figure 13:
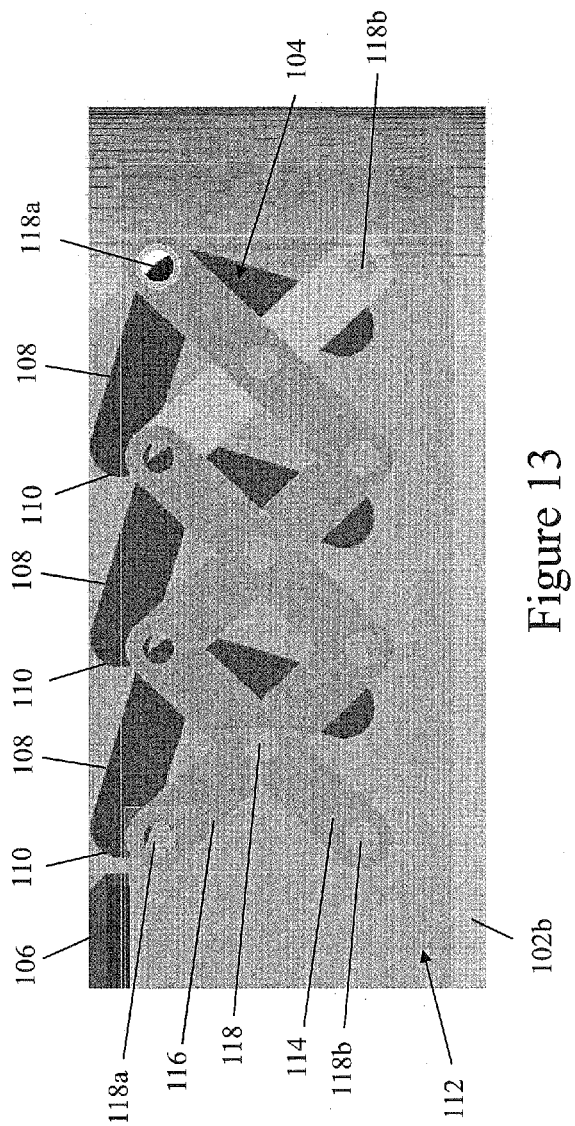
FIG. 13 is an enlarged view of the scissor linkage assembly of FIG. 12.

For example, FIG. 11 is a side view of the handheld electronic device 100 shown in FIG. 9, as it begins to move from the retracted keypad orientation to the extended keypad orientation. Notably, this initial movement exposes the third housing portion 102c. FIG. 12 is a side view of the handheld electronic device 100 shown in FIG. 11, as it continues to move from the retracted keypad orientation to the extended keypad orientation, while FIG. 13 is an enlarged view of the dashed portion of FIG. 12. Notably, FIG. 13 illustrates how the second or edge surfaces 110 of the keys begin to recess down into the second housing portion 102b, whereas the first or top surfaces 108 of the keys begin to rise in an upward direction.

Figure 14:
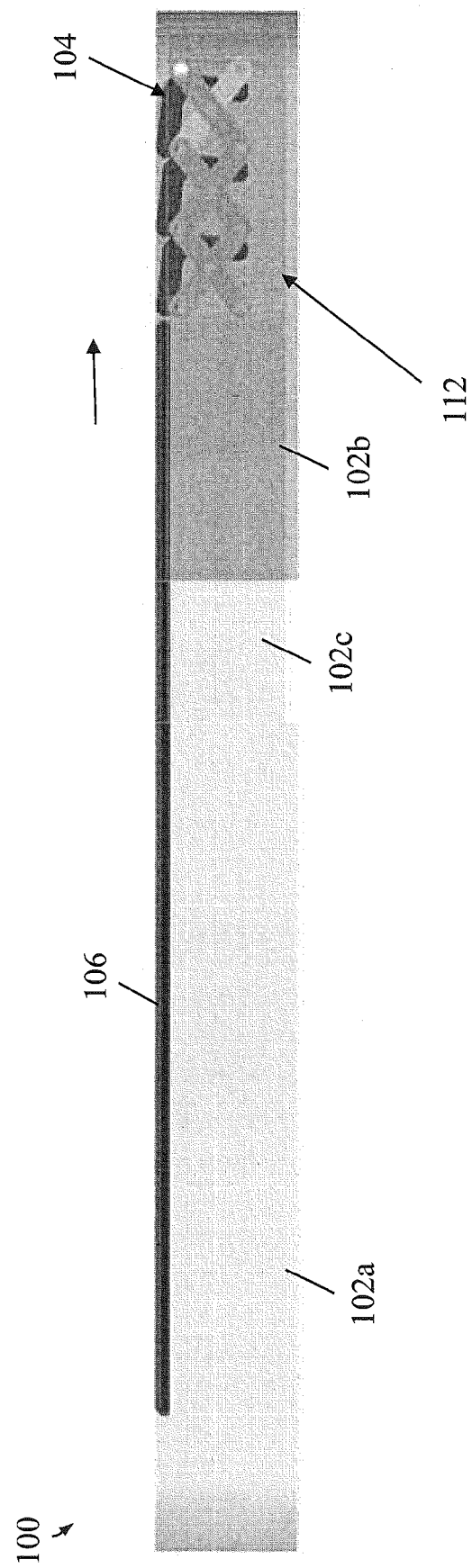
FIG. 14 is a side view of the handheld electronic device shown in FIG. 12, as it continues to move from the retracted keypad orientation to the extended keypad orientation.
Figure 15:
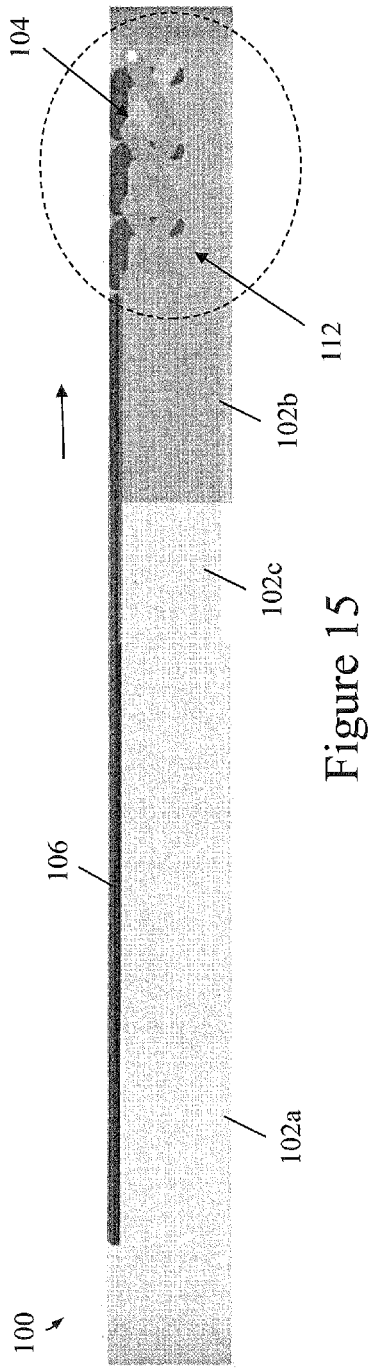
FIG. 15 is a side view of the handheld electronic device shown in the fully retracted keypad orientation.
Figure 16:
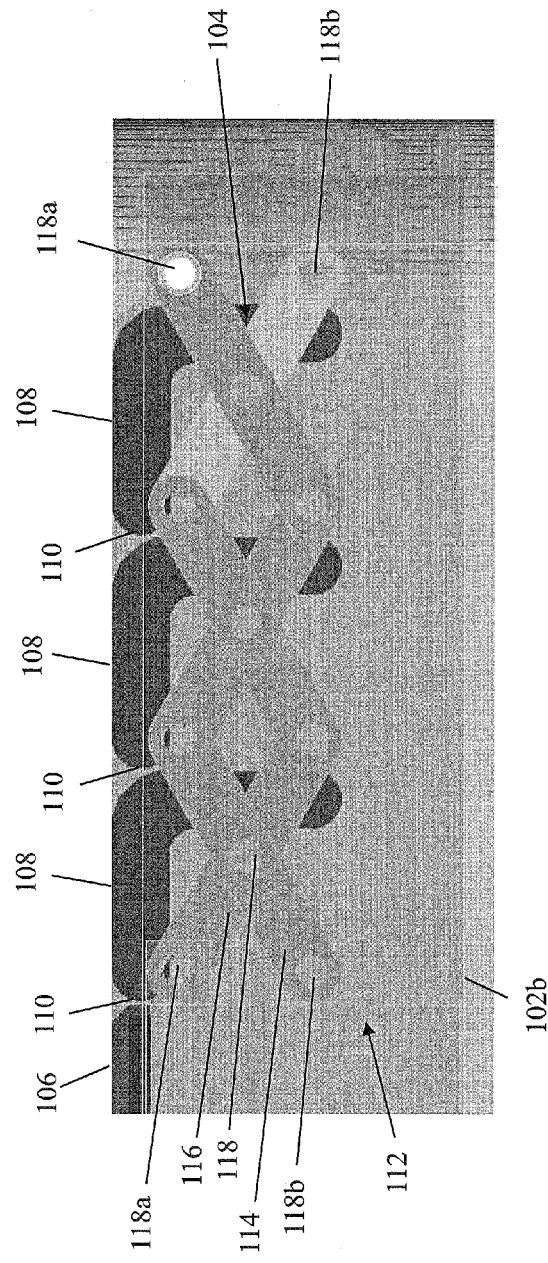
FIG. 16 is an enlarged view of the scissor linkage assembly of FIG. 15.

Next, in FIG. 14, the handheld electronic device 100 is shown as it continues to move from the retracted keypad orientation toward the extended keypad orientation. In FIG. 15, the handheld electronic device 100 is shown in the fully extended position. FIG. 16 is an enlarged view of the dashed portion of FIG. 16. As can be seen from FIG. 16, the second or edge surfaces 110 of the keys are now completely recessed into the second housing portion 102b, while the first or top surfaces 108 of the keys are fully exposed for user access.

It should be appreciated that the above described scissor linkage assembly 112 is one contemplated mechanism for performing lateral and rotational translation of the individual groups of keys in the keypad assembly. Other linkages may also be used, including, but not limited to for example, a pivot arm assembly or some type of worm drive assembly. The primary, hand-activated open/closed travel of the above described keypad assembly embodiments may also be automated with various configurations of micromotors, gears, linkages, etc. That is, in addition to the above described mechanisms, other mechanisms are also contemplated for performing the travel movement from one keypad orientation to the other.

Referring now to FIG. 17, there is shown a perspective view of an exemplary key structure 120 that may be utilized as a first portion of a key assembly, in accordance with an embodiment. As is shown, the key structure 120 is generally L-shaped and includes a first member 122 that is generally disposed in a horizontal orientation and a second member 124 substantially orthogonal to the first member 122, generally disposed in a vertical orientation. The first member 122 includes a top surface 126 that receives a keystroke input from a user's finger, and may be shaped in any appropriate manner to facilitate desired tactile characteristics. The second member 124 includes an actuator 128 that, as described below, contacts a switch so as to detect depression of the key structure 120. The actuator 128 may be an appropriately shaped and sized protrusion to carry out the desired functionality set forth more fully hereinafter. Further, the actuator 128 may be integrated with or formed from a same material as the second member 124, or may be formed from a different material and/or affixed to the second member 124. A pivot hole 129 may be provided, for example, at the junction of the first and second members 122, 124, about which the key structure 120 may pivot when depressed and released.

FIG. 18 is a perspective view of an exemplary rotating frame 130 serving as a second portion of a key assembly, utilized in conjunction with a plurality of key structures 120, such as shown in FIG. 17. The rotating frame 130 includes a wall 132 (FIG. 19) that is generally aligned with the second member 124 of the key structure 120. The wall 132 includes a plurality of dome switches 134 (dashed lines) associated with an inner surface of the wall 132 that are associated with an actuator 128 of a corresponding key structure 124. In addition, the rotating frame 130 may include at least a pair of L-shaped brackets 136 at opposing ends thereof so as to allow attachment of the key assembly to a rotation and translation mechanism (e.g., the scissor mechanism described previously). Each bracket 136 may include one or more mounting holes 138 for attachment to a linkage, as well as a pivot hole 139 that lines up with the pivot holes 129 of the key structure 120.

FIG. 19 is a perspective view of an exemplary key assembly 140 illustrating the relationship between the key structures 120 of FIG. 17 and the rotating frame 130 of FIG. 9.

Although not specifically illustrated in FIG. 19, the actuator 128 of each key structure 120 is engaged with a corresponding dome switch 134 of the rotating frame. Disposed on an outer surface of the wall 132 are a plurality of circuits 142 in signal communication with the dome switches 134, wherein the circuits detect depression of a given dome switch 134 (and hence depression of an individual key structure 120). Alternatively, the circuits 142 shown in FIG. 19 may be embodied in a single circuit mounted on the outer surface of the wall 132.

As stated above, the individual keys 120 may be mounted to the rotating frame 130 through a pin 144 that passes through the aligned holes 139 of the rotating frame 130 and the holes 129 of the key structures 120. Other attachment arrangements, however, are also contemplated so long as each key structure 120 may be independently depressed. As also indicated above, the rotating frame 130 (and hence the entire key assembly 140) may be rotated through a mechanism such as the scissor linkage 146 (e.g., of the scissor linkage assembly 112 described earlier) shown in dashed lines in FIG. 19.

Finally, FIGS. 20 and 21 more clearly illustrate the functional relationship between the key structure 120 and the rotating frame 130. In particular, FIG. 20 is a side cross sectional view of the key assembly 140 including the key structure 120 and rotating frame 130 in a non-depressed position, while FIG. 21 is a side cross sectional view of the key assembly 140 shown in a depressed position so as to engage the dome switch 134 of the rotating frame. In the non-depressed position shown in FIG. 20, the second member 124 of the key structure 120 is substantially parallel with the wall 132 of the rotating frame 130. The actuator 128 may or may not be in physical contact with the dome switch 134 in this position, so long as the dome switch 134 is not depressed to the extent that it is activated. That is, the circuitry 142 does not detect activation of the dome switch 134. As also shown in the Figures, the circuitry 142 may be connected to leads 144 or other electrical signal connection that communicates with other circuitry of a handheld device.

When, as shown in FIG. 21, the top surface 126 is depressed in the direction of the downward arrow, the key structure 120 pivots slightly about a point corresponding to the hole 129, in turn causing the second member 124 of the key structure 120 to translate in the direction of the horizontal arrow. Thereby, the actuator 128 engages and depresses the dome switch 134 so as to indicate a key stroke. In an exemplary embodiment, the degree of rotation about the pivot point may be relatively small, such as a few degrees.

As will thus be appreciated, an exemplary key assembly for a handheld device, includes one or more L-shaped key structures each having a first member configured to receive an input keystroke and a second member substantially orthogonal to the first member; and a frame configured to receive the one or more L-shaped key structures, the frame having a wall aligned with the second member of the key structure, with the wall further comprising a switch for each of the one or more L-shaped key structures associated with an inner surface of the wall, wherein each switch is proximate to an actuator associated with the second member of the corresponding key structure such that depression of a given key structure causes the actuator of the second member of the key structure to engage the switch of the wall.

As will be further appreciated, an exemplary handheld electronic device includes a housing; and a keypad assembly configured within the housing; the keypad assembly including one or more groups of keys configured for movable positioning between a first orientation and a second orientation. The keypad assembly further includes one or more L-shaped key structures each having a first member configured to receive an input keystroke and a second member substantially orthogonal to the first member; and a frame configured to receive the one or more L-shaped key structures, the frame having a wall aligned with the second member of the key structure, with the wall further comprising a switch for each of the one or more L-shaped key structures associated with an inner surface of the wall, wherein each switch is associated with an actuator associated with the second member of the corresponding key structure such that depression of a given key structure causes the actuator of the second member of the key structure to engage the switch of the wall. In the first orientation, a top surface of the first member of an individual key structure is exposed to a user, and in the second orientation the top surface of the first member rotationally (or rotationally and translationally) retracts into the housing so as to expose an edge surface of the first member.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A key assembly for a handheld device, comprising:
   one or more L-shaped key structures each having a first member configured to receive an input keystroke and a second member substantially orthogonal to the first member; and
   a frame configured to receive the one or more L-shaped key structures, the frame having a wall aligned with the second member of the key structure, with the wall further comprising a switch for each of the one or more L-shaped key structures associated with an inner surface of the wall, wherein each switch is associated with an actuator associated with the second member of the corresponding key structure such that depression of a given key structure causes the actuator of the second member of the key structure to engage the switch of the wall, wherein the frame is rotatable with respect to a housing of the handheld device.

2. The key assembly of claim 1, wherein each of the one more L-shaped key structures pivots about a point proximate a junction between the first member and the second member.

3. The key assembly of claim 2, wherein each of the one more L-shaped key structures independently pivots with respect to one another.

4. The key assembly of claim 1, wherein each switch associated with the wall comprises a dome switch.

5. The key assembly of claim 4, wherein each actuator comprises a protrusion associated with the second member of the L-shaped key structure.

6. The key assembly of claim 5, wherein the wall further comprises, for each dome switch, circuitry disposed on an opposite side of the wall with respect to the dome switches, the circuitry configured to detect depression of the dome switch.

7. The key assembly of claim 1, wherein, in a non-depressed position, the second member of the key structure is substantially parallel with the wall of the frame.

8. The key assembly of claim 1, wherein the frame further comprises L-shaped brackets attached to opposing ends thereof, the L-shaped brackets configured for attachment of the frame to a linkage mechanism that facilitates rotation of the frame.

9. The key assembly of claim 8, wherein the linkage mechanism comprises a scissor linkage mechanism.

10. A handheld device, comprising:
    a housing; and
    a keypad assembly configured within the housing;
    the keypad assembly including one or more groups of keys configured for movable positioning between a first orientation and a second orientation, the keypad assembly further comprising:
      one or more L-shaped key structures each having a first member configured to receive an input keystroke and a second member substantially orthogonal to the first member; and
      a frame configured to receive the one or more L-shaped key structures, the frame having a wall aligned with the second member of the key structure, with the wall further comprising a switch for each of the one or more L-shaped key structures associated with an inner surface of the wall, wherein each switch is associated with an actuator associated with the second member of the corresponding key structure such that depression of a given key structure causes the actuator of the second member of the key structure to engage the switch of the wall;
    wherein, in the first orientation, a top surface of the first member of an individual key structure is exposed to a user, and in the second orientation the top surface of the first member rotationally retracts, or rotationally and translationally retracts into the housing so as to expose an edge surface of the first member.

11. The device of claim 10, wherein the housing further comprises a segmented housing having at least a first portion and a second portion that abut one another in the second orientation, with the first and second portions configured to expand apart from one another along a first axis thereof to transition from the second orientation to the first orientation, thereby revealing a third portion of the segmented housing, and the first and second portions further configured to retract back along the first axis to transition from the first orientation to the second orientation, thereby hiding the third portion of the segmented housing.

12. The device of claim 10, wherein each of the one or more L-shaped key structures pivots about a point proximate a junction between the first member and the second member.

13. The device of claim 10, wherein each of the one or more L-shaped key structures independently pivots with respect to one another.

14. The device of claim 10, wherein each switch associated with the wall comprises a dome switch.

15. The device of claim 14, wherein each actuator comprises a protrusion associated with the second member of the L-shaped key structure.

16. The device of claim 15, wherein the wall further comprises, for each dome switch, circuitry disposed on an opposite side of the wall with respect to the dome switches, the circuitry configured to detect depression of the dome switch.

17. The device of claim 10, wherein, in a non-depressed position, the second member of the key structure is substantially parallel with the wall of the frame.

18. The device of claim 10, wherein the frame is rotatable with respect to the housing of the handheld device.

19. The device of claim 18, wherein the frame further comprises L-shaped brackets attached to opposing ends thereof, the L-shaped brackets configured for attachment of the frame to a linkage mechanism that facilitates rotation of the frame.

20. The device of claim 19, wherein the linkage mechanism comprises a scissor linkage mechanism.

* * * * *